Feb. 7, 1939.  O. G. BURCH  2,146,172
TOASTER
Filed Jan. 6, 1938  2 Sheets-Sheet 1
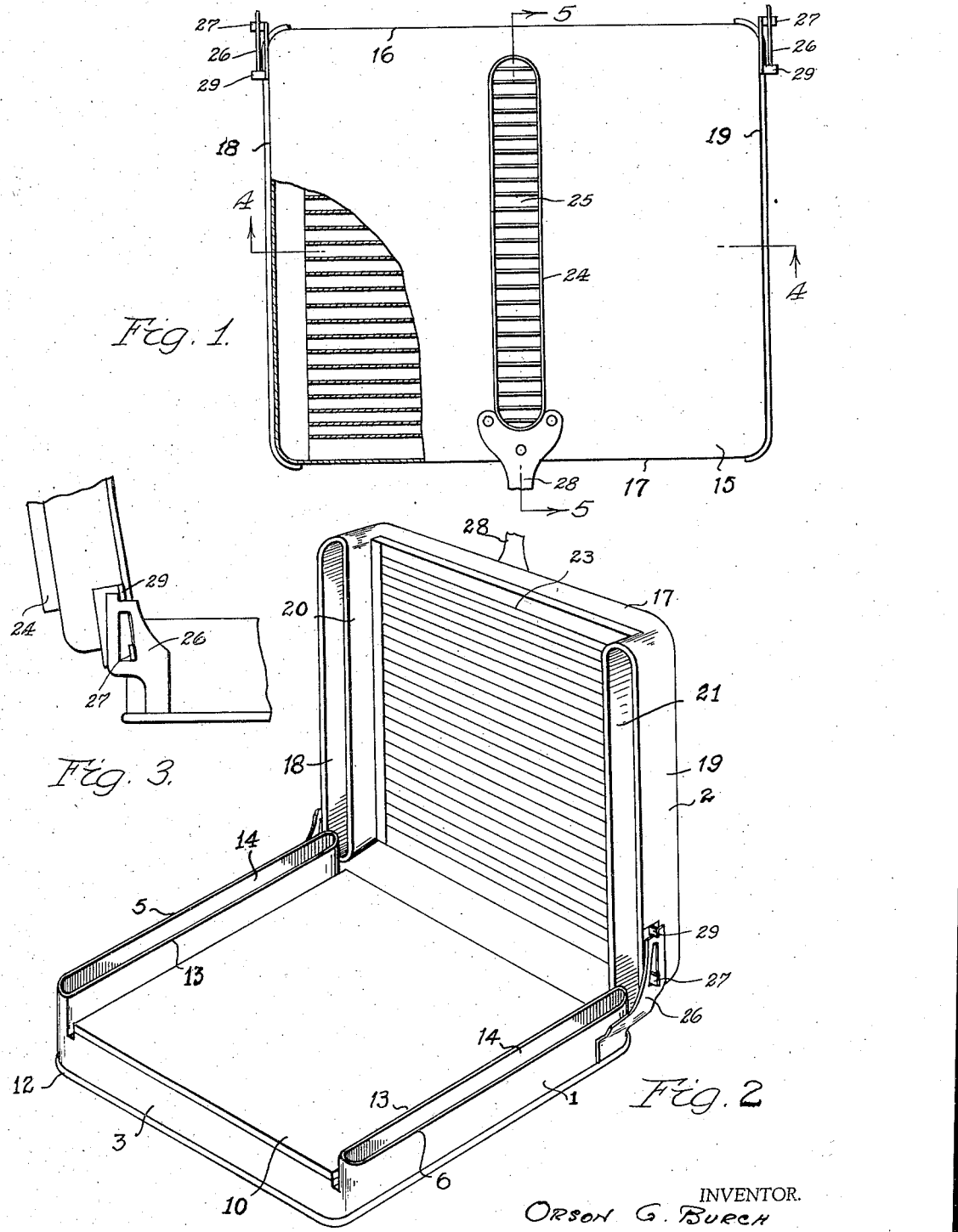
INVENTOR.
ORSON G. BURCH Feb. 7, 1939. O. G. BURCH 2,146,172
TOASTER
Filed Jan. 6, 1938 2 Sheets-Sheet 2
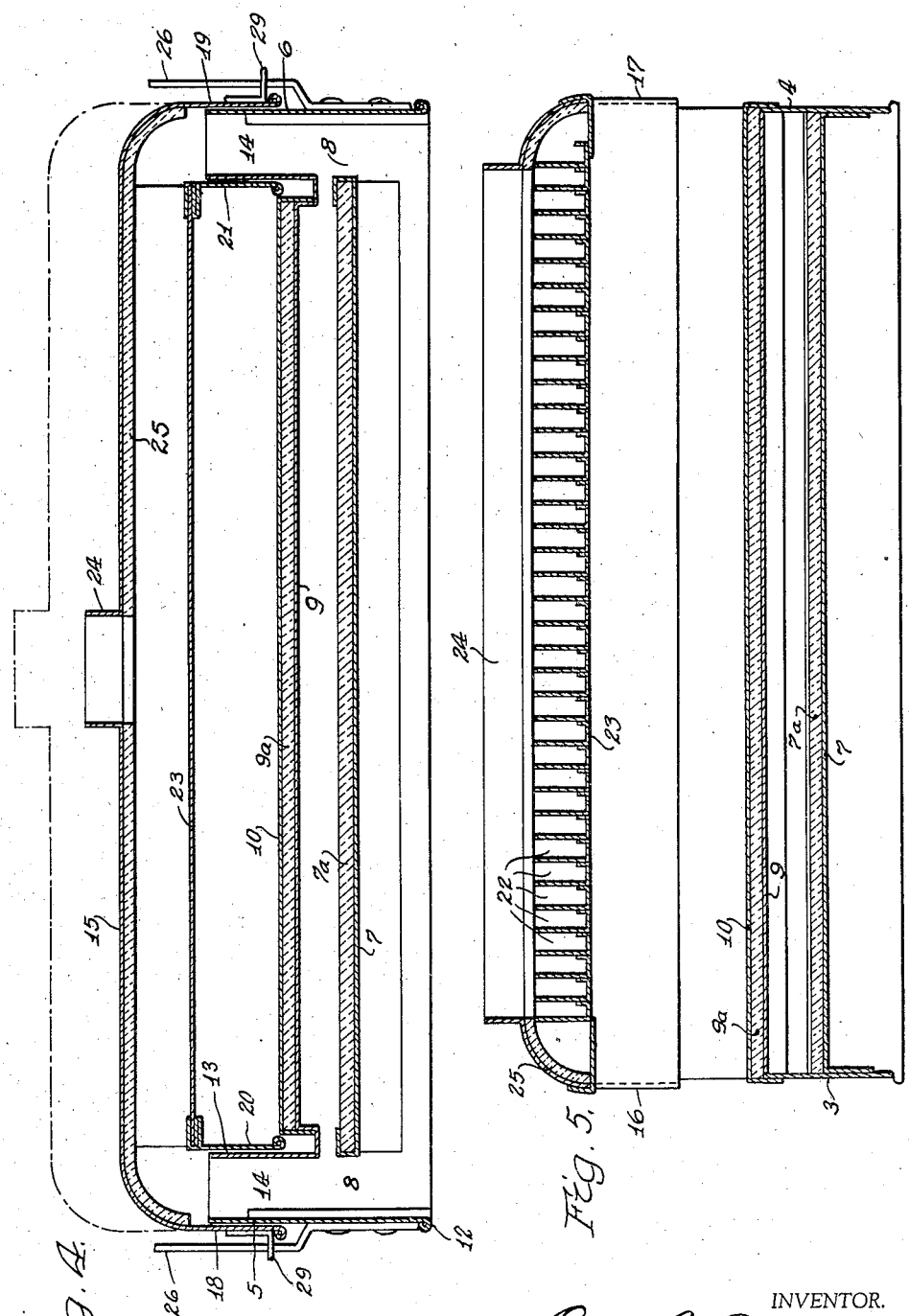
INVENTOR.
ORSON G. BURCH
BY
ATTORNEY.

Patented Feb. 7, 1939

2,146,172

UNITED STATES PATENT OFFICE 2,146,172

TOASTER

Orson G. Burch, Detroit, Mich.

Application January 6, 1938, Serial No. 183,597

1 Claim. (Cl. 53—5)

This invention relates to bread toasters of the type particularly suitable for use over an open flame and has for its object to provide an improved device of neat appearance and sturdy construction which will transfer heat uniformly over the surface of a piece of bread therein.

Another object is to provide a toaster comprising parallel surfaces for direct contact with a slice of bread whereby the toasting is accomplished by conduction and to so form and arrange the surfaces that the products of combustion from the heating flame will heat the two surfaces uniformly.

A further object is to provide a toaster which, when removed from above a flame, will act as an oven to maintain one or several pieces of toast warm for a substantial period of time awaiting eating.

More specifically, it is an object to provide two parallel plate surfaces for direct contact with a slice of bread, the surfaces being hinged together in such manner that they will accommodate slices of any thickness and likewise a sandwich.

Other objects and advantages will become hereinafter more fully apparent as reference is had to the accompanying drawings wherein my invention is illustrated and in which:—

Fig. 1 is a plan view of my improved toaster, partially broken away for illustrative purposes, Fig. 2 is a perspective view in open position, Fig. 3 is a side elevation with the top elevated of the hinge end, Fig. 4 is a vertical section taken along the line 4—4 of Fig. 1, and Fig. 5 is a vertical section taken along the line 5—5 of Fig. 1.

1 indicates the bottom section and 2 the top section of a bread toaster. The bottom section 1 is conveniently made rectangular in cross-section with four vertical walls 3, 4, 5, 6, the end walls 3, 4 of which are of less height than the side walls. Bridging the end walls is a flame contacting surface 7, the top surface of which is covered with an insulating material 7a. The sides of the support are substantially spaced from the side walls 5 and 6 thereby providing two passageways 8 for products of combustion.

Parallel with the surface 7 and of substantially equal area therewith is a second layer of insulating material 9a such as asbestos supported by a sheet metal piece 9 secured to the walls 3 and 4 and covered with a second sheet of metal 10 constituting a bread contacting surface. The sheet 7 is substantially above the bottom rim 12 of the section 1 so that when the section 1 is placed over a gas flame the space thus formed constitutes a combustion chamber, the flame playing against the piece 7 and the products of combustion finding their way out the passages 8. Any other heat source may be used.

Extending upwardly from the side edges of the shelf 7 are vertical walls 13 of substantially equal length with the side walls 5 and 6 and forming therewith two oval-shaped flues 14 as a continuation of the spaces 8.

The upper section 2 comprises an outer shell having a rectangular top portion 15 with depending side walls 16, 17, 18, 19 and an inner multipart shell. The inner shell is made up of two side walls 20 and 21 of substantially equal length with the walls 18 and 19 and forming therewith oval shaped flues which telescope with the walls of the flues 14, and a multiplicity of walled passages 22 made of strips of L-cross section secured together to form a bread contacting surface 23. The passages 22 are open to the flues so that the products of combustion converge at the stack 24 which encompasses an elongated slot in the top 15. Between the top of the strips forming the passages 22 and the top 15 is an insulating pad 25.

The bottom section 1 has a slotted hinge member 26 secured thereto at opposite sides and the top section 2 has two hinge members 27 for engagement with the members 26, the slots of the members 26 permitting relative vertical adjustment of the two surfaces 10 and 23 to accommodate any thickness of bread slice. For a thinner slice the surfaces 10 and 23 are closer together and there is corresponding greater telescoping of the flues of the lower section 1 with those of the upper section. A handle 28 is provided for elevation of the upper section. A stop 29 is also provided to retain the top in upright position. By lifting the top vertically from the position illustrated in Fig. 3 the stop 29 may be disengaged and the top section may be rotated to a position parallel with the lower section.

Reference is made to my copending application, Serial No. 205,066, wherein the subject matter is broadly claimed.

What I claim is:—

A bread toaster comprising opposed substantially horizontal vertically spaced surfaces for direct contact with a slice of bread, the lower one of said surfaces having sidewalls depending therefrom for the support thereof above an open flame, said lower surface having a flue extending upwardly therefrom for the products of combustion from said flame, the upper one of said surfaces having a flue to receive the products of combustion from the flue of the lower surface, said upper surface comprising a series of joined L-shaped members with the bases coplanar and the upright branches thereof comprising fins to collect heat from the products of combustion passing through said flues.

ORSON G. BURCH.